D. B. DOVEL.
COMBINED HEATER AND MUFFLER FOR MOTOR VEHICLES.
APPLICATION FILED JUNE 30, 1916.
1,245,888.
Patented Nov. 6, 1917.
2 SHEETS—SHEET 1.
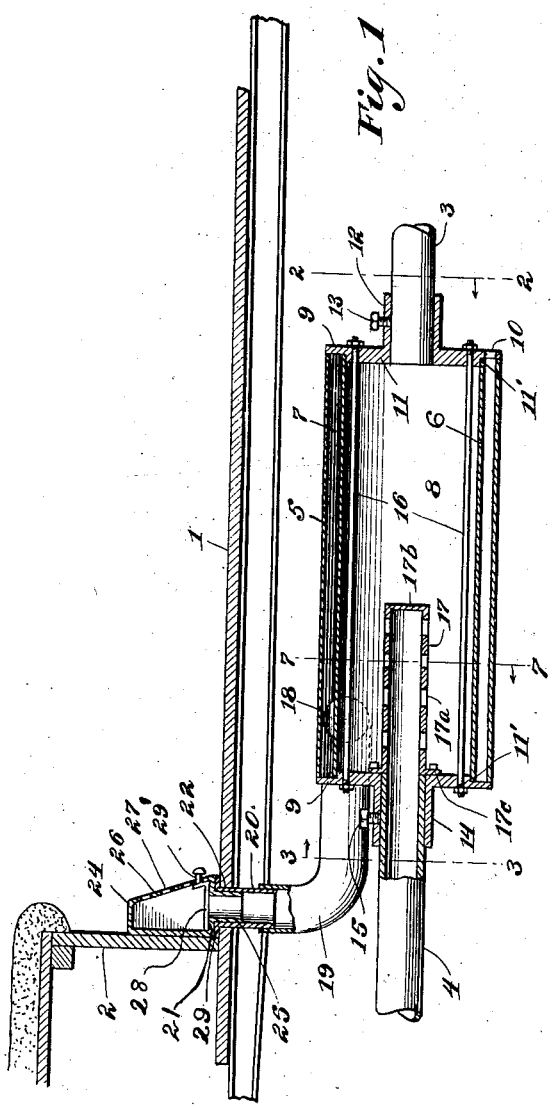
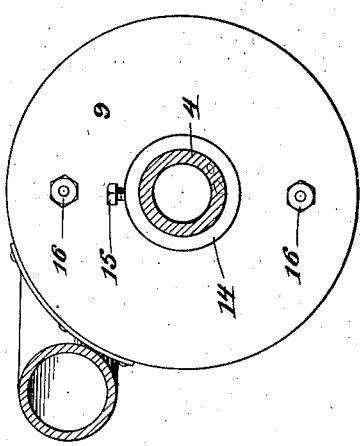
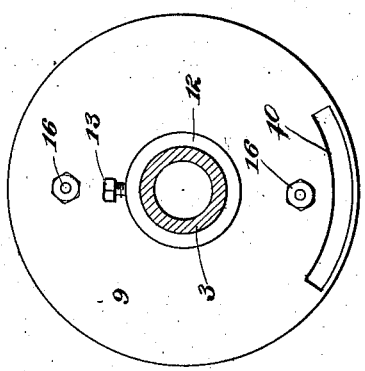
Witnesses
C. F. Rudolph
P. M. Smith.
Inventor
D. B. Dovel,
By Victor J. Evans
Attorney D. B. DOVEL.
COMBINED HEATER AND MUFFLER FOR MOTOR VEHICLES.
APPLICATION FILED JUNE 30, 1916.
1,245,888.
Patented Nov. 6, 1917.
2 SHEETS—SHEET 2.
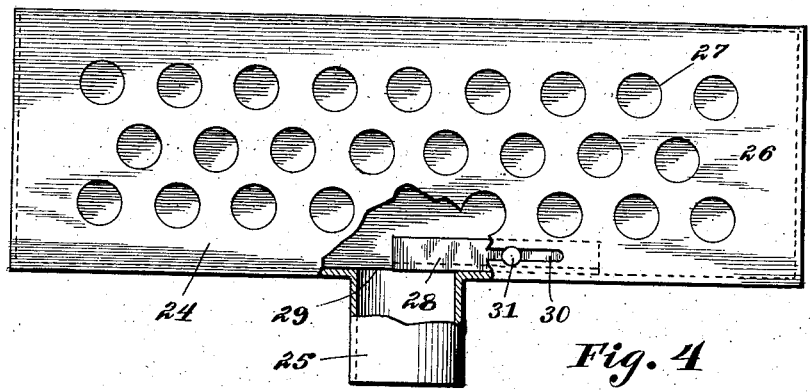
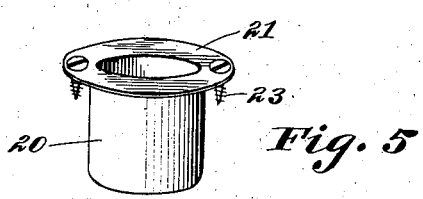
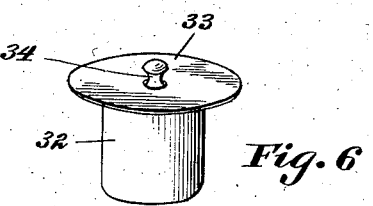
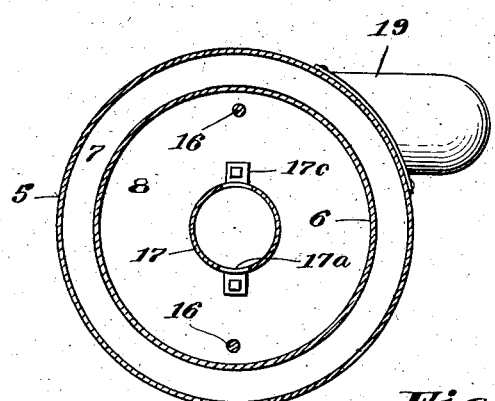
Inventor
D. B. Dovel,
By Victor J. Evans
Attorney
Witnesses
C. F. Rudolph
P. M. Smith

UNITED STATES PATENT OFFICE.

DARLEY B. DOVEL, OF PICKERINGTON, OHIO.

COMBINED HEATER AND MUFFLER FOR MOTOR-VEHICLES.

1,245,888.   Specification of Letters Patent.   Patented Nov. 6, 1917.

Application filed June 30, 1916.   Serial No. 106,902.

*To all whom it may concern:*

Be it known that I, DARLEY B. DOVEL, a citizen of the United States, residing at Pickerington, in the county of Fairfield and State of Ohio, have invented new and useful Improvements in Combined Heaters and Mufflers for Motor-Vehicles, of which the following is a specification.

This invention relates to combined heaters and mufflers for motor vehicles the broad object of the invention being to produce apparatus of the character referred to which is applicable to any motor vehicle and which may be readily applied thereto in a short time without interfering with the appearance of the vehicle, the apparatus embodying a radiator which may be placed in a position and removed therefrom in a moment, the remainder of the apparatus being practically unnoticeable after the removal of the radiator.

A further object of the invention is to provide in connection with such apparatus, means whereby the heat may be supplied to or wholly or partly cut off from the radiator without leaving the car and in accordance with atmospheric conditions and the comfort of the occupants of the vehicle.

With the above and other objects in view, the invention consists in the novel construction, combination, and arrangement herein fully described, illustrated and claimed.

In the accompanying drawings:—

Figure 1 is a vertical longitudinal section through a sufficient portion of the motor vehicle to illustrate the present invention in its applied relation to the vehicle, the muffler, heater and other parts associated therewith being shown in section.

Fig. 2 is a vertical section on the line 2—2 of Fig. 1.

Fig. 3 is a vertical section on the line 3—3 of Fig. 1.

Fig. 4 is a face view of the radiator, partly broken away to show the damper.

Fig. 5 is a detail view of the floor plate.

Fig. 6 is a similar view of the floor plug.

Fig. 7 is a vertical cross section through the muffler and heater on the line 7—7 of Fig. 1 looking in the direction of the arrow.

Referring to the drawings 1 designates the floor of the vehicle, 2 one of the seats thereof, 3 the exhaust pipe leading from the engine, and 4 the exhaust pipe leading from the muffler.

In the preferred embodiment of the combined muffler and heater proper, I employ a tubular cylindrical body comprising an outer shell or drum 5 and an inner shell or drum 6 arranged in spaced relation to each other to leave an intervening hot air chamber 7 extending entirely around the muffling or expansion chamber 8 which is formed by the inner shell 6. The hot air chamber 7 is closed at its opposite extremities by end walls 9, the front one of which is cut away to leave the fresh air inlet 10 arcuate in shape as shown in Fig. 2, air being admitted in this way to the hot air chamber 7 where it is heated by radiation from the inner shell 6.

At opposite ends of the inner and outer shells 5 and 6, there are heads 11, one of which is formed with a tubular extension 12 in which the adjacent end of the exhaust pipe 3 of the engine is inserted and held by means of one or more binding screws 13. The other head 11 is also formed with a tubular extension 14 in which the end of the exhaust pipe 4 is inserted and held by means of a binding screw 15. The heads 11 are held in fixed relation to the hot air chamber by means of tie bolts 16 the opposite ends of which are inserted through the heads 11 and provided with clamping nuts as shown.

17 represents an outlet pipe for the burned and expanded gases within the muffling or expansion chamber 8, said outlet pipe being formed with any desired number of perforations 17$^a$ and having its inner end closed by a head 17$^b$, the other end thereof being open and provided with lugs 17$^c$ or the equivalent thereof adapting said outlet pipe 17 to be fastened in the inner face of the adjacent head 11 as shown. The heads 11 are formed with annular rabbets 11' to receive the hot air chamber, the bolts 16 passing longitudinally through the muffling or expansion chamber 8.

The casing 5 is formed adjacent to one end thereof with a laterally extending nipple 18 adapted to have fitted thereon one end of an angular hot air conduit pipe 19. The other end of said pipe 19 is fitted around a pendant tubular extension 20 of a floor plate 21, the extension 20 being cylindrical or tubular in shape so as to fit downwardly through a round hole 22 bored through the floor 1 of the vehicle; the floor plate 21 is permanently fastened in place by screws 23 or the equivalent thereof.

24 designates a radiator which receives the hot air from the pipe 19 and which is provided with a downwardly projecting tubular neck 25 which fits into the tubular extension 20 of the floor plate so that it may be easily placed in position and removed therefrom. One wall 26 of the radiator is preferably inclined as shown and formed with a large number of vent holes 27 to allow the heated air to escape into the body of the vehicle, it being understood that the radiator 24 may be located either in the rear compartment or front compartment of the vehicle and either in rear or in front of the feet of the occupants of the vehicle. The inlet neck 25 of the radiator is adapted to be opened and closed by means of a sliding plate damper 28 which rests upon internal shoulders 29 of the radiator and which is provided with a stem 29' projecting through a slot 30 in the inclined wall of the radiator where it is provided with a knob or handle 31 enabling the damper to be partly or wholly closed or opened to thereby regulate the amount of hot air admitted to the radiator.

In the summer season, the radiator may be lifted from its useful position and laid aside for future use. In place of the radiator I then employ a floor plate plug 32 having a head or flange 33 at the top thereof adapted to rest directly against the floor plate, the plug being shown as formed with the lifting knob or handle 34.

In order to equip a motor vehicle with a device of this invention, it is only necessary to bore a hole of approximately two inches in diameter in the floor of the vehicle, and fasten the floor plate therein. Then the connection or pipe 19 may be introduced between the floor plate and the heater casing 9 and the radiator may be placed in position by inserting the neck 25 thereof into the opening in the floor plate 21. When the radiator is no longer needed, it may be lifted out of place and the plug 32 substituted therefor. The muffler at present in use may be dispensed with and the combined muffler and heater of this invention may be slipped on the engine exhaust pipe and the muffler exhaust pipe slipped in place in relation to the muffler.

The apparatus is of simple and economical construction, is easily applied, and does not detract in any way from the appearance of the vehicle.

I claim:—

An engine exhaust pipe embodying two sections having their adjacent ends separated from each other, in combination with a combined muffler and heater of greater diameter than said exhaust pipe and comprising outer and inner imperforate and concentric cylindrical shells forming a central muffling chamber and an air heating chamber annular in cross section closed on all sides and surrounding the muffling chamber, heads at opposite ends of said chambers one of which is formed with a fresh air inlet leading to the air heating chamber, the other head having a hot air delivery connection, tubular pipe receiving extensions projecting outwardly from said heads and receiving the ends of said exhaust pipe sections, and a perforated exhaust receiving pipe having one end thereof closed and arranged within, and adjacent to the middle of the muffling chamber and having the other end thereof open and fastened internally to the head having the delivery connection in line with one of the exhaust pipe sections.

In testimony whereof I affix my signature.

DARLEY B. DOVEL.